United States Patent [19]
Wenger et al.

[11] 4,118,164
[45] Oct. 3, 1978

[54] HIGH-OUTPUT APPARATUS FOR PRODUCING DENSE, UNIFORMLY LAYERED MEAT ANALOGUE PRODUCT

[75] Inventors: La Von Gene Wenger; Douglas S. Clark; Bobbie W. Hauck, all of Sabetha, Kans.

[73] Assignee: Wenger Manufacturing, Sabetha, Kans.

[21] Appl. No.: 816,005

[22] Filed: Jul. 15, 1977

[51] Int. Cl.$^2$ ............................................... A23P 1/00
[52] U.S. Cl. ...................................... 425/202; 366/79; 425/205; 425/208; 425/378 R
[58] Field of Search .............. 425/208, 202, 205, 376, 425/378 R, 380, 382; 426/512, 516, 517; 259/191; 366/79; 99/348

[56] References Cited
U.S. PATENT DOCUMENTS

| | | | |
|---|---|---|---|
| 3,008,184 | 11/1961 | Fritsch | 425/208 X |
| 3,070,836 | 1/1963 | DeHaven et al. | 425/208 X |
| 3,416,929 | 12/1968 | Boushka | 426/519 |
| 3,505,085 | 4/1970 | Straughn et al. | 425/208 |
| 3,666,386 | 5/1972 | McElroy et al. | 425/376 R X |
| 3,814,779 | 6/1974 | Wiley | 425/208 X |
| 3,862,265 | 1/1975 | Steinkamp | 425/376 R X |
| 3,932,086 | 1/1976 | Kasamatsu | 425/208 |
| 3,970,761 | 7/1976 | Wenger et al. | 426/656 |
| 3,980,013 | 9/1976 | Bredeson | 425/208 X |
| 4,025,274 | 5/1977 | Vemura et al. | 425/208 X |

Primary Examiner—Francis S. Husar
Assistant Examiner—William R. Briggs
Attorney, Agent, or Firm—Schmidt, Johnson, Hovey & Williams

[57] ABSTRACT

A commercially feasible, high-output extrusion apparatus and method is provided for producing vegetable protein based meat analogue products characterized by discrete, untwisted, manually separable meat-like layers and at relatively high production rates. The method involves passing hot, moist, pretreated vegetable protein material through an extruder barrel and causing formation of a first choke of the material intermediate the ends of the barrel, subdivision of the material downstream of the first choke point in the presence of steam for thorough cooking and moisturizing of the material, rechoking of the subdivided material adjacent the extrusion end of the barrel, and extrusion of the material as a dense, layered meat analogue product. The apparatus preferably includes a plurality of especially configured, axially aligned screw elements within the extruder barrel, including an intermediate cut-flight screw for forming the first choke, and an axial extrusion or die spacer at the extrusion end of the barrel for facilitating layering of the end product. The overall production apparatus advantageously includes a pair of extruders for sequentially denaturing the vegetable protein based material and rendering the same hot and flowable, whereupon the hot material can be extruded as a layered meat analogue product from the second extruder.

17 Claims, 6 Drawing Figures

HIGH-OUTPUT APPARATUS FOR PRODUCING DENSE, UNIFORMLY LAYERED MEAT ANALOGUE PRODUCT

This invention relates to a high-output extrusion apparatus, and a corresponding method, for producing meat analogue products of the type disclosed and depicted in co-owned U.S. Pat. No. 3,970,761 at relatively high production rates necessary for commercial operations. More particularly, it is concerned with such an apparatus and method wherein a hot, flowable, vegetable protein based material is passed through an extruder barrel with choking of the material intermediate the ends of the latter, subdivision of the material downstream from the first choke point, recombination and rechoking of the material adjacent the extrusion end of the barrel, and extrusion of the material as a layered product.

U.S. Pat. No. 3,970,761 relates to a method of preparing a dense, uniformly layered, vegetable protein meat analogue which can be used as a full substitute for meat such as pork, beef, fish and poultry in a wide variety of foods. The method described in this patent represents a major breakthrough in the art of extrusion cooking, and the products resulting therefrom are greatly superior to previous meat extenders or other extruded products in terms of versatility of use and advantageous organoleptic properties. In view of the fact that the presently described method and apparatus are primarily directed to production of meat analogues of the type and character described in U.S. Pat. No. 3,970,761, the latter patent is hereby expressly incorporated by reference herein.

The investigations leading to the methods described in U.S. Pat. No. 3,970,761 were carried out using intermediate sized extrusion equipment having a relatively low output capacity. Specifically, a pair of especially designed Wenger Model X-25 extruders were used in connection with these experiments, to produce the products photographically illustrated in the referenced patent. As will be readily seen from these photographs, the products produced using this relatively small equipment were in every way superior to prior products and acceptable as chunk-type full meat substitutes.

It will be readily appreciated, though, that such relatively small equipment may not be economical for use in large scale commercial operations. Rather, to achieve desirable economies of scale, it is necessary to use correspondingly larger extrusion equipment, such as those sold by Wenger Manufacturing of Sabetha, Kan. under the designation of "X-200" machines. Therefore, in view of these realities, numerous attempts were made to scale-up the intermediate sized equipment used in conjunction with initial experimentation with the process described and claimed in U.S. Pat. No. 3,970,761, so as to duplicate the process and product with large equipment.

Suprisingly, it was discovered that a straight-forward scale-up of the smaller equipment originally used does not solve the problem of providing a high-output apparatus and method for producing the desired meat analogue products. Attmepts at such scaling-up resulted in some surging and blowing of the vegetable protein material at the final extrusion die, which must be avoided if a uniformly layered, untwisted analogue product is to be produced. Furthermore, the product produced with such scaled-up equipment often exhibited incomplete lamination or a "grainy" look which was absent from the meat analogue products produced with the smaller equipment. For these reasons, as well as others, it was quickly determined that a problem of providing a high-output apparatus and method for producing the desired meat analogues was considerably more complex than had originally been thought.

It is therefore the most important object of the present invention to provide an extrusion apparatus, and a corresponding method, for producing layered, untwisted, full meat analogues of the type depicted and described in U.S. Pat. No. 3,970,761, at production rates which are feasible for large commercial operations, and with the avoidance of processing problems such as plugging, blowing and surging at the final extrusion die, and irregular lamination of the final product.

As a corollary to the foregoing, another object of the invention is to provide a final extruder for use in the process described in U.S. Pat. No. 3,970,761 which includes a plurality of axially aligned screw elements therein which serve to initially form a choke of the hot, flowable material passing through the extruder at a point intermediate the ends of the barrel, and therefore allow subdivision of the initially choked material downstream of the first choke point, and recombination of the material toward the extrusion end of the barrel for smooth, even, stable extrusion thereof as a layered meat analogue product.

Another object of the invention is to provide an apparatus of the type described wherein a pair of serially related extruders are employed, namely, the first extruder for heating and moisturizing a mix comprising a vegetable protein material such as soy flour and moisture to render the same hot, flowable, substantially denatured and unoriented, and a second extruder first receiving the extrudate from the frist extruder which completes the extrusion cooking operation and produces a desired final product by initially choking the material, subdividing the latter for thorough and uniform cooking and moisturizing thereof, and rechoking and passing the material through an elongated extension adjacent the extrusion end of the die which facilitates layering of the product.

Figures 1, 2:
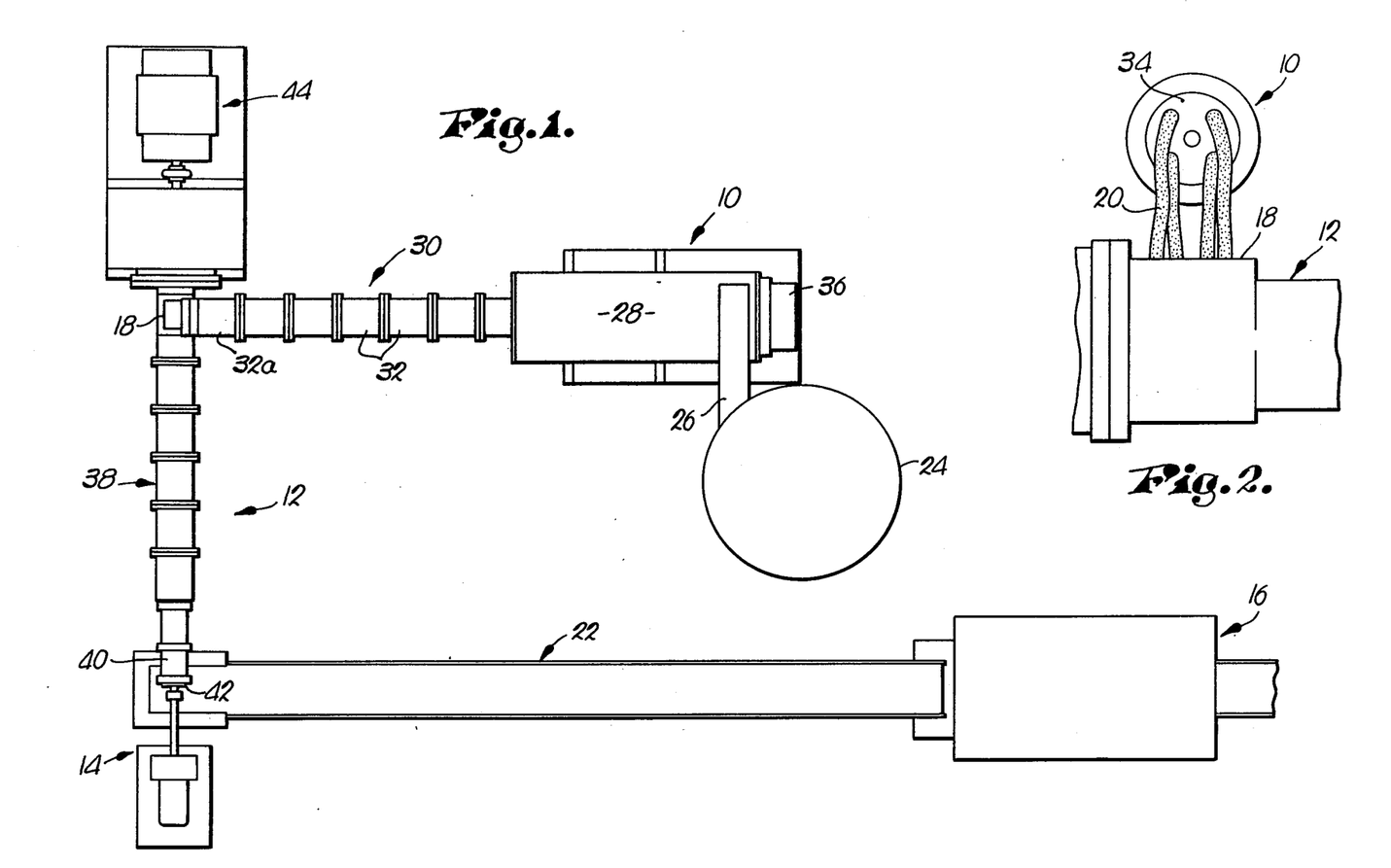
FIG. 1 is a somewhat schematic, plan view of the double extrusion apparatus in accordance with the present invention.
FIG. 2 is an enlarged, fragmentary elevational view illustrating the gravitational flow of the extrudate from the first extruder into the inlet of the second extruder.

The preferred double extrusion apparatus of the present invention is illustrated in FIGS. 1 and 2. Broadly, this apparatus includes a first extruder 10 (hereinafter referred to as the No. 1 extruder), an adjacent secondary extruder 12 (hereinafter referred to as the No. 2 extruder), a rotary cutting knife assembly 14, and a conventional product dryer/cooler 16. As illustrated, the No. 2 extruder 12 is positioned adjacent the output end of the No. 1 extruder 10 and in general perpendicular relationship thereto. The inlet 18 of extruder 12 is positioned in spaced relationship below the output or extrusion end of extruder 10, so that the rope-like extrudate 20 from the latter passes through the atmosphere into extruder 12. Of course, in other instances conventional conveying equipment can be interposed between the No. 1 and No. 2 extruders for carrying extrudate to the latter. The significance of this orientation will be explained below. Finally, conventional conveyor structure 22 is provided for delivery of the meat analogue product emerging from No. 2 extruder 12 to dryer/cooler 16.

In more detail, primary extruder 10 illustrated in the drawings is a Wenger Model X-200 extrusion cooker which includes an upright, open top frustoconical material hopper 24 which is situated above the main body of the extruder for receiving dry ingredients to be processed. An outlet pipe 26 extends from the bottom of hopper 24 to an elongated, high speed mixing cylinder 28. Steam and water lines (not shown) are attached to cylinder 28 for the purpose of selectively conveying measured quantities of moisture thereto for intimate admixing with and increasing the temperature of the dry ingredients from hopper 24. Cylinder 28 is operatively connected to an elongated, multiple-head extrusion barrel generally designated by the numeral 30. In this case, barrel 30 includes a series of axially aligned and interconnected tubular heads which have individual surrounding jackets (not shown) for the introduction of heating or cooling media such as steam, cold water or other coolant as needed in order to control the temperature of the admixture passing through the respective areas of barrel 30. Additionally, each head is provided with fluid delivery and discharge lines (not shown), and a steam and/or water inlet is provided with barrel 30 so that moisture can be added directly as desired to the mixture flowing therethrough. The final head 32a of barrel 30 terminates in a die plate 34 having a series of die orifices therethrough (see FIG. 2), so the product introduced into the rearward end of barrel 30 can be extruded from the forward end thereof in an axial direction relative to the barrel. In this case, four equidistantly spaced and circularly arrange die openings are provided, but of course extrusion dies of other configurations could also be used.

An elongated, multiple-flight helical auger screw (not shown) is positioned within barrel 30 for the purpose of moving the product through the barrel under conditions of relatively high mechanical shear, agitation and pressure. As is conventional, the auger is made up of a number of axially interconnected screw elements which cooperatively extend substantially the entire length of the segmented barrel 30. Motive power for extruder 10 is provided through the use of a large electric motor assembly 36 which is coupled through conventional means to the barrel auger in order to effect axial rotation of the latter at desired rotational speeds. Also, conventional control means are provided for the purpose of selective control and adjustment of the operational perameters of extruder 10, including the rotational speed of the extrusion auger, as well as moisture delivered to mixing cylinder 28 and extruder barrel 30, and the type and amount of heat exchange media fed to the individual surrounding jackets of barrel 30. As noted above, the No. 1 extruder 10 in the present overall apparatus is in many respects similar to the first extruder depicted and described in U.S. Pat. No. 3,970,761. In this regard, the purpose of the initial extruder in both the present invention and that described in the subject patent is to pretreat a mixture which includes a vegetable protein material such as soy flour and moisture in order to render the same hot, flowable, denatured and substantially unoriented; accordingly, scale-up of the No. 1 extruder is a relatively straightforward matter from the relatively small X-25 unit to the large X-200 machine.

No. 2 extruder 12 is likewise a large capacity X-200 size Wenger extruder which has been especially modified for the purposes of the present invention. Broadly, extruder 12 includes an elongated barrel 38 having a series of aligned, end-to-end interconnected tubular sections which will be described in detail hereinafter. In addition, extruder 12 includes an elongated, tubular extension or die spacer 40 interposed between the final extrusion die 42 and the adjacent head. Conventional drive means broadly referred to by the numeral 44 is operatively coupled to the elongated auger within barrel 38, for controlled rotation of the latter.

Figure 3:
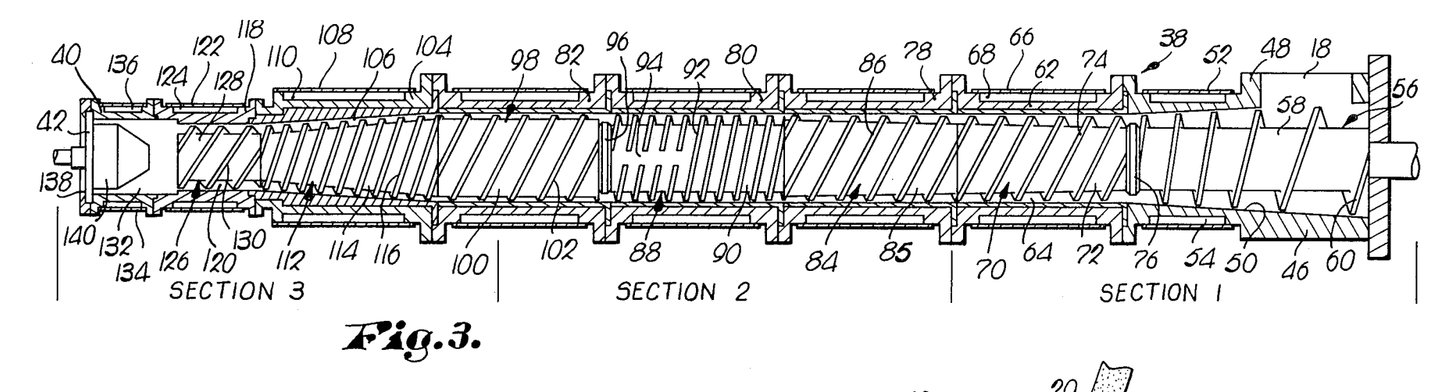
FIG. 3 is a fragmentary, schematic, cross sectional view of the extruder barrel and screw elements forming a part of the second extruder.

Attention is now directed to FIG. 3 which illustrates in detail the configuration of barrel 38 and the aligned, interconnected screw elements therewithin. The first head 46 includes opening-defining structure 48 which presents the material inlet 18 for barrel 38. The inner wall of head 46 is uniformly and inwardly tapered along the length thereof as at 50, while an outermost surrounding jacket 52 disposed about the head 46 which defines an annular passageway 54 for introduction of heat exchange media such as steam or water. First screw element 56 disposed within head 46 includes an elongated, constant diameter shaft 58 and helical flighting means 60 on the latter. It is to be noted that the flighting 60 is of variable pitch length such that the convolutions thereof are progressively spaced in closer relationship to one another along the length of shaft 58.

Second head 62 is directly coupled to head 46 and includes a constant diameter inner sidewall 64 and an exterior jacket 66 for defining a heat exchange media passageway 68. Second screw element 70 rotatably positioned within head 62 is configured to present a uniformly decreasing free volume within the latter. For this purpose, shaft 72 of screw element 70 is tapered outwardly from the end thereof adjacent screw element 56 toward the inner wall surface of the surrounding head. Flighting 74 on shaft 72 is similarly configured with decreasing flight depth along the length of shaft 72 for this purpose.

A steam lock restriction or die 76 is interposed between the adjacent ends of the screw elements 56 and 70. Steam lock restriction or die 76 is of conventional construction and serves to facilitate the buildup of pressures within second head 62. Third head 78, fourth head 80 and fifth head 82 are identical with second head 62; accordingly, the details of these respective heads need not be further described.

Third screw element 84 housed within head 78 is also configured for presenting a decreasing free volume within the latter, and in effect the elements 84 and 70 are designed to cooperatively present a uniformly decreasing free volume along the length of heads 2 and 3. Again, the shaft 85 of screw element 84 is tapered outwardly toward the surrounding inner sidewall of head 78, and the depth of the flighting 86 thereon is likewise appropriately tapered. It will also be noted that the helix angle of the flighting 74, and that of flighting 86, is identical, and that this helix angle is greater than that of flighting 60. In effect, screw elements 70 and 84 serve to quickly convey material introduced through inlet 18 along the associated length of barrel 38.

Fourth screw element 88 includes a cylindrical, constant diameter central shaft 90, along with peripheral flighting 92. The helix angle of flighting 92 is substantially less than that of flighting 86; moreover, a cut-flight area 94 or an elongated section where a portion of the flighting is relieved is provided in screw element 88. As illustrated, the cut-flight area extends from the edge of element 88 remote from element 84 halfway along the length of the element 88. Another steam lock 96 is provided adjacent the forward end of screw element 88, with the steamlocks 96 and 76 being identical.

Fifth screw element 98 presents a constant free volume within surrounding head 82, and for this purpose the element 98 includes an elongated shaft 100 and flighting 102 which is disposed at a helix angle in excess of that of flighting 92. However, the free volume within head 82 is greater than the corresponding free volume within head 80, and this is important for reasons to be made clear.

Sixth head 104 is directly coupled to the forward end of head 82 and includes a decreasing, uniformly tapered inner sidewall 106, as well as a surrounding jacket 108 presenting a heat exchange fluid passageway 110. sixth screw element 112 is configured to present a uniform free volume along the length thereof, and includes an inwardly tapered shaft 114 and corresponding flighting 116 of increasing depth.

Seventh head 118 is substantially shorter than the previously described heads, and includes a circular inner sidewall 120, and a surrounding jacket 122 presenting a fluid passageway 124. Seventh screw element 126 is a constant volume screw which includes a cylindrical shaft 128 and flighting 130 disposed at a helix angle which is greater than that of flighting 116.

Tubular extension or die spacer 40 is directly coupled to the forward end of head 118, and presents a smooth circular inner sidewall 132. The diameter of spacer 40 is such that flow of material thereinto from the seventh head is substantially unimpeded. The spacer 40 in effect serves as an eighth head in barrel 38 and includes a surrounding jacket 134 which encloses a fluid exchange passageway 136. A die plate 42 is mounted over the end of spacer 40 remote from screw element 126, and includes a series of circularly arranged die openings 138. Additionally, flow-directional means in the form of bullet-shaped structure 140 is provided within spacer 40 adjacent die 42 for facilitating layering of the material to be extruded.

Although not essential to the operation of extruder 12, a series of ribbed sleeves are provided in heads 1–7. In the latter connection, the sleeves within heads 1 and 3–7, inclusive, include a plurality of circumferentially arranged, longitudinally oriented, radially inwardly extending ribs; on the other hand, the sleeve within head 2 of barrel 38 is provided with a continuous, inwardly extending, helical rib.

Although not shown in detail in the drawings, it is to be understood that respective fluid conduits are provided to each of the separate heat exchange fluid passageways surrounding the respective heads of barrel 38. This is to allow selective introduction of steam and/or water thereto as needed for temperature control. Moreover, ports (not shown) are provided through the respective heads for insertion of monitoring equipment such as thermocouples or the like, or introduction of steam directly into the barrel 38. These expedients are of course well known to those skilled in the art.

In actual practice, an admixture comprising a vegetable protein and moisture, along with other desired additives, is passed in serial order through the extruders 10 and 12 for producing the desired meat analogue products. Preferably, the vegetable protein is taken from the group consisting of the defatted oilseed flours or concentrates, the proteins of soy, wheat, corn, cottonseed, rapeseed, peanut, sesame, sunflower, mung bean, and mixtures thereof, along with moisture (either in the form of steam and/or water) such that the admixture is initially from about 20 to 55 per cent by weight moisture (more preferably from about 30 to 45 per cent moisture). As used in this instance, the moisture content refers to the total moisture present, i.e., native moisture and that added. It is especially preferred to employ a member taken from the group of defatted soy flour, soy bean meal, wheat gluten, corn gluten, defatted cottonseed flour, vegetable protein concentrates, vegetable isolates, peanut flour, soy concentrates, rapeseed flour, rapeseed concentrates, sesame flour, sunflower flour, mung bean flour, and mixtures thereof along with moisture to form the admixture. Using the described apparatus, the first step of the process would involve admixing of the previously mixed dry components along with steam and/or water in the mixing cylinder of the No. 1 extruder at a temperature which may range from about 175°–250° F. At this point the premixed material is passed in the conventional fashion through the No. 1 extruder barrel in order to render the premixed material hot, flowable, substantially unoriented and untexturized. This is facilitated by supplying the appropriate heat exchange media to the individual heads of the No. 1 extruder; for example, water may be directed to certain of the initial heads, with steam to the remainder of the heads. Preferably, the material is extruded at a temperature of from about 150°–300° F. (preferably about 200°–275° F.), and at a pressure of from about 5–150 p.s.i.g. (preferably 40–80 p.s.i.g.), although these conditions are not critical. As best seen in FIG. 2, the material extruded from the No. 1 extruder is in the form of a hot, sticky, frothy, thermoplastic "rope" 20. This extrudate passes through the atmosphere for volatilization of undesirable flavor precursors therein, and thence into inlet 18 of No. 2 extruder 12.

Figure 4:
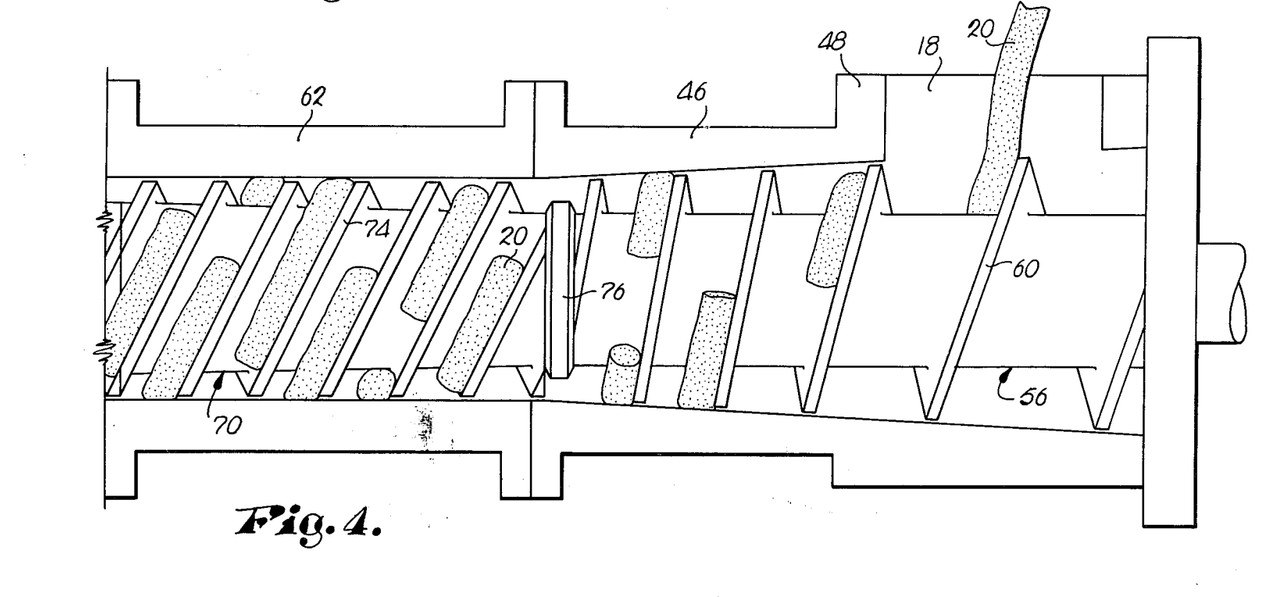
FIG. 4 is an enlarged, fragmentary view of section 1 of the extruder barrel illustrated in FIG. 3, and showing the passage of the rope-like extrudate from the first extruder through section 1 of the second extruder.

The operation of extruder 12 in cooking and forming the pretreated vegetable protein cereal is best described with reference to FIGS. 4–6, which individually illustrate the physical alterations of the extrudate 20 in respective sections 1, 2 and 3 (see FIG. 3). The immediately following discussion is limited to the observed changes in the extrusion material which take place within barrel 38. These changes occur by virtue of (1) the geometry of the barrel and screw elements, and (2) the operating conditions such as temperatures and pressures within the barrel. The preferred temperatures and pressures will be described hereinafter, and it is to be understood that these operate with the barrel and screw configuration for producing the desired product. It is also to be understood that the sectioning of barrel 38 is essentially arbitrary and done for purposes of facilitating a full and complete description of the invention; in reality the process is a continuous one along the length of barrel 38, although certain process zones or areas therein are evident.

In any event, as the rope-like extrudate 20 passes or is conveyed into inlet 18, it is first engaged and moved along the length of section 46 by first variable pitch screw element 56. The generally helical movement of the extrudate 20 is continued until the latter is passed into second head 62, whereupon second screw element 70 picks up the extrudate and moves it forwardly. The increased helix angle of flighting 74 serves to more quickly transport the material along the barrel 38, so that the pieces or sections of the extrudate 20 are moved closer together, for ultimate compaction as will be described.

Figure 5:
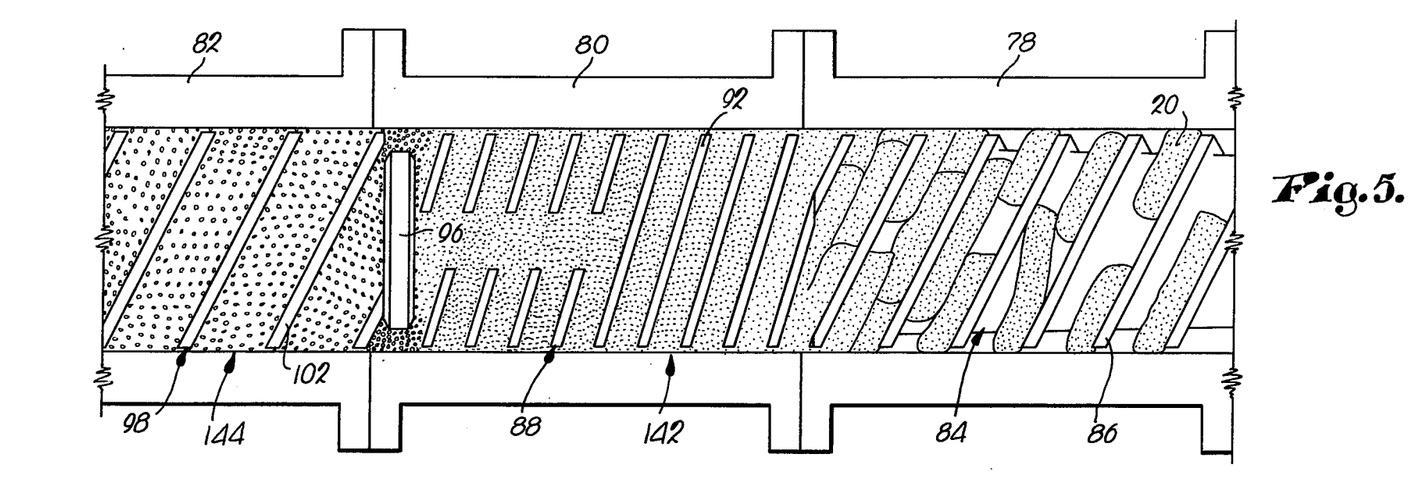
FIG. 5 is an enlarged, fragmentary view of section 2 of the extruder depicted in FIG. 3, and showing the passage of the material to be extruded therethrough, including the choking of the material and initial subdivision thereof into a beadlet-like structure.
Figure 6:
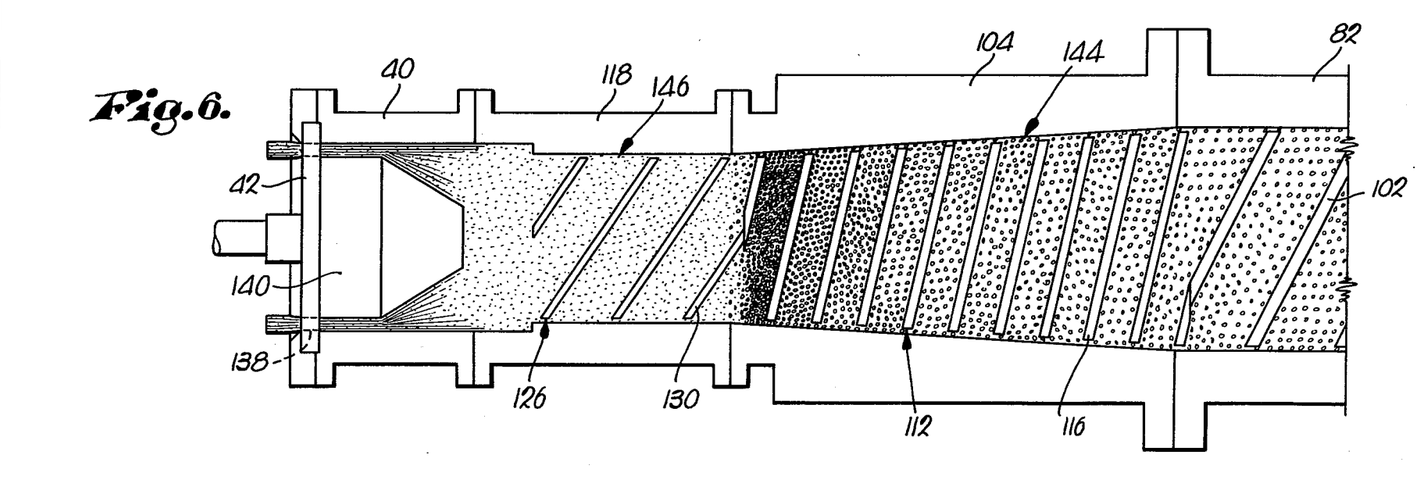
FIG. 6 is an enlarged, fragmentary view of section 3 of the extruder illustrated in FIG. 3 which shows the passage of the beadlet-like subdivided material through section 3 of the second extruder, with recombination thereof at a second choke point and extrusion thereof as a layered product.

Referring now to FIG. 5, it will be seen that the extrudate 20 passes through third head 78 where the process of initial compaction actually begins. Actual observation of the material in the third head indicates that the elongated pieces of extrudate 20 remain in a discrete condition throughout virtually the entire length of the third head, but the pieces thereof are usually reduced in size.

Fourth head 80, in conjunction with cut-flight screw element 88, serves to combine the extrudate pieces and present a first choke of material in barrel 38, generally referred to by the numeral 142. In this connection, the relatively small pitch and helix angle of flighting 92, along with provision of cut-flight area 94, are chiefly responsible for the compaction of the material within the fourth head. The cut-flight portion of screw 88 serves to increase the residence time of the material within the fourth head, while also assuring that the material is thoroughly admixed and heated.

As the compacted material leaves fourth head 80 and enters fifth head 82, the material is subdivided or shredded into a large number of relatively small, beadlet-like masses 144. These masses preferably have a diameter of from about one-sixteenth to one-half inch, and, by virtue of the rolling action imparted thereto within barrel 82, assume a somewhat spherical shape. This beadlet formation is augmented by flashing of steam from the compacted mass of material as the latter passes into head 5 (which has a greater free volume than that of head 4).

These beadlet-like masses pass through head 82 and into sixth head 104. During the passage through the fifth and sixth heads, the beadlets are thoroughly and uniformly cooked and moisturized in the presence of steam. As described, steam is flashed from the compacted material as it passes into the fifth head from the first choke point within head four, and the closed nature of barrel 38 prevents escape of this steam.

In the latter part of the sixth head 104, and seventh head 118, the beadlet-like masses 144 are recombined to present a second choke of material 146 which fills the seventh head. At this point the recombined material is passed into the extension 40 for extrusion through the die 42 in a manner fully described in U.S. Pat. No. 3,970,761. Attention is directed to the latter patent for details regarding the formation of a layered structure in the final extrudate; briefly however, this is believed to stem in part from the axial motion imparted to the material in the extension 40 prior to extension thereof. The layered product emerging from the No. 2 extruder is then conventionally cut, dried and cooled.

In practice, barrel 38 is heated throughout substantially the entire length thereof by introduction of steam into the respective heat exchange media passageways. This serves to completely cook the material and, along with the barrel and screw geometry, cause formation of steam in the material which is important for the above-described reasons. The final product is advantageously extruded at a temperature of from about 100°-320° F., and a pressure of from about 5-80 p.s.i.g.

The following hypothesis or theory of operation has been developed in an attempt to explain why the apparatus and method of the invention are capable of producing, in high yield, the desired meat and analogue products. However, it is to be understood that the inventors do not wish to be bound to any particular theories or the like; rather, the following represents merely a possible explanation of operation.

It is believed that the chief problems encountered in a scale-up from relatively small sized extruder equipment to commercial units involves inadequate heat transfer to the vegetable protein based material in the larger machine, and a concomitant tendency in the larger machines to run irregularly because the extrusion material therein is not uniformly heated and moisturized. The heat transfer problem seem to arise from three separate sources: (1) The mechanical energy dissipated as heat per unit length of the extruder per pound of product appears to be lower in the operation of large commercial machines than in the operation of the relatively small unit; (2) The heat transfer surface area in the commercial machine is approximately twice as large per unit length as in the small unit, whereas the output of material from the former is three times as great; and (3) uniform heating, mixing and homogenization of the material to be extruded in the generally deeper flighting of the large machine is more difficult to achieve than in the case of the generally shallower flights of the small unit.

In order to overcome these heat transfer problems, the described secondary extruder 12 has been developed. The most important aspect of this unit is believed to reside in provision of means for initially choking the material within the extruder barrel, subdividing the latter downstream from the choke point, and recombining the material prior to extrusion thereof. In the latter connection, screw element 88 within the fourth head of barrel 38 is believed to perform three functions. First, section 88 within the extruder barrel adds additional heat to the material within head four. This stems from the fact that the material is compacted and held by pressure against the inner surface of the barrel; frictional energy is also high in the fourth head, leading to additional cooking of the material. Concentrated heating of the material within the fourth head in turn causes formation of steam within the material, as the moisture therein vaporizes.

Screw 88 also serves to mix and homogenize the material as it is heated. The cut-flight area 94 in this screw greatly aids mixing by reducing the conveying efficiency of the screw and by disturbing the "dead zones" of material that develop in the regular helical paths of material which are created by the uniform geometry of the first, uncut flight section at the rearward end of screw 88. The sharp edges of the cut flights also cut into the material creating new surfaces which recombine and aid mixing.

Finally, screw 88 works together with the rapidly conveying screw elements within heads two and three to smooth out any temporary fluctuations of feed rate into extruder 12. Thus, screw element 88 serves to smooth out the flow of material and meter the same at a relatively constant rate toward the extrusion end of the extruder. It is known that layering and formation of the desired meat analogue product is maximized with constant material flow, and accordingly the metering function of the No. 4 screw element is believed important.

As noted, the compacted and choked material within head 4 is subdivided during passage thereof into the fifth head. This is believed to result from the rapid release or flashing of the steam within the material as the latter enters the fifth head; this causes a shredding or "explosion" of the material into many individual particles or masses, and these are subsequently rolled into beadlets by the relative motion of the screw.

Screw 98 located within head 5 contains shallow and relatively wide flights, which, together with its partial loading of material, leads to very efficient heat transfer to the vegetable protein material. The material in the fifth head is not compressed against the inner barrel surface because the volumetric conveying capacity of head 5 is greater than that of head 4. Since little frictional energy is transferred in this section, most of the additional cooking in the fifth head is believed to stem from the presence of steam therein. These same conditions are duplicated in the sixth head as well, so as to assure uniform heating of the small material beadlets.

Thus, heads 5 and 6 can be thought of as steam chambers through which the vegetable protein material is conveyed in a subdivided condition. In this manner, the temperature and moisture levels within the beadlet-like masses 144 are rendered uniform. This facilitates ultimate production of the desired meat analogue products, since it is known that temperature and moisture uniformity in the vegetable protein material is important for achieving a uniform consistency and viscosity of material flow through the spacer 40; and this in turn results in a smooth extrusion flow and uniform product.

In head 7 the beadlet-like material (which has been uniformly cooked and moisturized) is recombined and in effect pumped as a molten, uniform mass into spacer 40, and then out through die 42. Again, the details of this final extrusion to produce a desired meat analogue product are explained in U.S. Pat. No. 3,970,761, and attention is directed to this explanation.

It will thus be seen that the present invention provides a high output extrusion apparatus, along with a corresponding method, for producing highly desirable, layered meat analogue products. Although the invention as described is directed primarily to relatively large commercial apparatus and methods, it is to be understood that the principles of the invention may also be applicable to smaller, intermediate sized equipment.

The following Examples illustrate the methods of the present invention, but nothing therein is to be taken as a limitation on the overall scope of the invention.

EXAMPLE I

Three separate experimental runs were undertaken to produce a layered, untwisted meat analogue product using the double extrusion apparatus illustrated in the drawings, as well as the method of the present invention.

In particular, the No. 1 extruder was of conventional design and was provided with an inlet bin, horizontal feeder, and double mixing cylinder. This extruder was equipped with five screw sections having steamlocks therebetween for facilitating cooking of the soy-based material fed into the extruder. A conventional die having four five-eights inch diameter openings therein was placed ahead of the final screw. Temperature control jackets were provided around the respective heads of the extruder for introduction of water or steam.

The inlet of the No. 2 extruder was placed in spaced relationship below the extrusion end of the No. 1 extruder for receiving extrudate from the latter. The No. 2 extruder included seven heads housing seven screw sections therein, in conjunction with an eighth head presenting a hollow tubular extension. The No. 2 extruder screws and other components used in these experiments were exactly as described above in connection with the preferred apparatus.

The dry materials used in these runs consisted of 3,000 lbs. of defatted soy flour, 339.6 grams of red No. 40 dye, 136.2 grams of sodium bisulfate, and 15 lbs. of lecithin. (Parenthetically, surface active agents other than the sulfur compounds can be used interchangeably in the process.) The materials were admixed with steam and water in the mixing cylinder of the No. 1 extruder, and passed through the barrel of the latter for rendering the mix hot, flowable and substantially unoriented. This extrudate was then fed to the No. 2 extruder and passed therethrough as described above to give a layered, untwisted meat analogue product of the type described and illustrated in U.S. Pat. No. 3,970,761.

During processing, water was passed through the jackets surrounding the first and second heads of the No. 1 extruder, and steam was passed through the jackets around heads three, four and five thereof. The data developed from the No. 1 extruder is set forth in Table I.

In the No. 2 extruder, water was passed to the jacket surrounding the first head, and steam was passed around the remaining six heads and the tubular extension adjacent the extrusion end of the barrel. The three runs in the No. 2 extruder were very similar, and the recorded conditions were: temperatures in heads 3–8, inclusive, 245° F., 295° F., 315°–325° F. 300° F., 285° F. and 265° F; moisture of the extruded product, 29.6% by weight; and product wet density, 28–30 lbs. per cubic foot.

The meat analogue products resulting from the described runs were very uniform and presented dense, substantially untwisted, manually separable, discrete layers. The analogues were of the type and character, and had the appearance and other organoleptic properties of, of the analogues depicted and described in U.S. Pat. No. 3,970,761.

During the operation of the No. 2 extruder, a port in the No. 4 head was opened, and the discharge therefrom was approximately 80% solids and 20% steam. This same test was made by opening a port at the No. 5 head, and there the discharge was about 20% beadlet-like solids and 80% steam. The recorded head pressure in the No. 4 head was about 40 p.s.i., and it is therefore postulated that between the fourth and seventh heads the soy-based material is finely subdivided into relatively small beadlets which are thoroughly and uniformly cooked in the presence of steam.

TABLE I

| | | | | No. 1 Extruder | | | | |
|---|---|---|---|---|---|---|---|---|
| Run No. | Steam to M.C.[1] | Water to M.C. | Temp. M.C. °F. | Screw Speed (rpm) | Temperatures °F. Head 3 | Head 4 | Head 5 | Product Moisture (% by wt.) | Product Density (lb./cu.ft.) |
| 1 | 400[2] | 9.4[3] | 210 | 263 | — | — | 250 | 25% | — |
| 2 | 450 | 6.3 | 210 | 263 | 180 | 175 | 175 | — | 28 |
| 3 | 450 | 6.3 | 210 | 263 | 250 | 255 | 255 | — | 28 |

[1]M.C. = Mixing cylinder
[2]Data given in pounds per hour
[3]Data given in pounds per minute After the operational data was recorded at the No. 2 extruder, the latter was stopped under load, and the barrel opened. This revealed that screw sections 1-3 were only partially filled, with some fragmenting of the rope-like product in the No. 3 section. The fourth, cut-flight screw was completely filled with product and presented a choke of material. The fifth and majority of the sixth screw sections were only partially filled with subdivided, beadlet-like material. Finally, the last part of the sixth screw, and all of the seventh screw, were completely filled with material and presented a second choke of material; this choke of material extended through the extension or die spacer (8th head) up to the final extrusion die. In this latter portion however, the above-described layering phenomenon was observed to yield the meat analogue products of the invention.

EXAMPLE II

Another series of experimental runs were undertaken with double extrusion apparatus in accordance with the present invention. In these runs certain minor modifications were made with respect to details of the extrusion equipment; however, in all cases a cut-flight screw was employed for creating a choke point midway along the length of the No. 2 extruder barrel, and the other screw sections therein were configured for subdivision of the material after initial choking, followed by rechoking and extrusion thereof. Again, the No. 1 extruder was used for rendering the vegetable protein based material hot, flowable and substantially denatured. In all material respects, the apparatus used in these runs was as described hereinabove and illustrated in the drawings.

plurality of juxtaposed, manually separable, discrete, untwisted layers.

The dry material fed through the double extrusion apparatus was exactly as described in Example I, and moisture in the form of water and/or steam was added thereto in the mixing cylinder of the No. 1 extruder and in the No. 2 extruder barrel. Furthermore, the inlet of the No. 2 extruder was spaced below the No. 1 extrusion die, and the extrudate from the latter passed through the atmosphere under the influence of gravity into the No. 2 extruder.

The data in Tables II and III was developed during these runs. In the second extruder, water was circulated around the No. 1 head, and steam was circulated around heads 2-6, inclusive. The 7th and 8th heads were automatically temperature controlled by known means in order to maintain a substantially uniform temperature therein. This control involved the selective introduction of steam or water as needed into the jackets surrounding the 7th and 8th heads.

Run No. 4 exhibited some surging and blowing at the final extrusion die of the No. 2 extruder. This was attributed to the production rate in this run, about 36 lbs. per minute. In the remaining runs 5-7 the production rate was lowered, and this resulted in very stable operating conditions and a uniformly layered, consistent product.

The above Examples demonstrate that a wide variety of operating conditions can be employed to good effect in the present invention. In reality, it is beleived that an almost limitless number of specific operating procedures can be used, as long as the principles of the present invention are observed.

TABLE II

| | | | | No. 1 Extruder | | | | |
|---|---|---|---|---|---|---|---|---|
| Run No. | [2]Steam to M.C. | [3]Water to M.C. | Screw Speed (rpm) | Temperatures °F. Head | Head | Head 5 | Die | Product Moisture (% by wt.) |
| 4 | 350 | 8.0 | 263 | — | 300 | 285 | 232 | — |
| 5 | 300 | 7.0 | 263 | — | 305 | 275 | 220 | — |
| 6 | 400 | 7.8 | 263 | — | 232 | 220 | 240 | — |
| 7 | 350 | 7.0 | 263 | 325 | 270 | 320 | 212 | 28.4 |

[1]In all cases, water was circulated around heads 1 and 2, and steam was circulated around heads 3, 4 and 5.
[2]M.C. = Mixing cylinder; data in pounds per hour
[3]Data in cc/second

TABLE III

| | | | No. 2 Extruder | | | | | | |
|---|---|---|---|---|---|---|---|---|---|
| Run No. | [1]Water Addition Extruder | Extruder Speed (rpm) | Temperatures °F. Head 4 | Head 5 | Head 6 | Head 7 | Extension (Head 8) | Wet Density (lb./cu.ft.) | [2]Product Rate |
| 4 | 1.8 | 130 | 270 | 292 | 280 | 290 | 290 | 25-28 | 36 |
| 5 | 1.3 | 130 | 272 | 291 | 283 | 290 | 290 | 28 | 32 |
| 6 | .3 | 130 | 260 | — | 282 | 305 | 320 | 29 | 32 |
| 7 | — | 130 | 290 | 292 | 280 | 282 | — | 28-32 | 32 |

[1]Data given in pounds per hour.
[2]Data given in pounds per minute.

The products resulting from these runs were generally of the type depicted in U.S. Pat. No. 3,970,761. Specifically, the products were dense and exhibited a

We claim:

1. Extrusion apparatus for producing a meat analogue product from a mixture comprising a vegetable protein and moisture, said apparatus comprising:

an elongated, tubular barrel having a material inlet adjacent one end thereof and an extrusion die adjacent the remaining end thereof; and an elongated, axially rotatable screw positioned within said barrel for moving said material from said inlet towards and through said die, said screw including first, second and third longitudinally aligned sections, said first screw section having first flight means for moving said material from said inlet along the length of said barrel towards said second screw section, said second section having second flight means for compacting the material received from said first section, forming a first choke of the material within the barrel, said section also having additional flight means thereon which is cooperable, with the adjacent surrounding portion of said barrel, for subdivision of said material during travel thereof toward said third section, wherein said second section includes means to cut into the material and increase the residence time of said material in the region thereof.

said third section having third flight means for substantially recombining said subdivided material and forming a second choke of said material within the barrel.

2. Extrusion apparatus as set forth in claim 1 wherein said second section includes a cut flight screw element which serves to increase the residence time of said material in the region thereof whereby to form said first choke.

3. Extrusion apparatus as set forth in claim 1 wherein said additional flight means, and said cooperable surrounding barrel portion, present a region of increased free volume within said barrel, as compared with the free volume within the barrel at the point where said first choke is formed, said last-mentioned free volume being defined by the material-compacting and choking portion of said second flight means and the adjacent surrounding length of said barrel.

4. Extrusion apparatus as set forth in claim 1 wherein said third section includes a longitudinally tapered screw element, with the portion of said barrel surrounding said tapered element being complementally tapered.

5. Extrusion apparatus as set forth in claim 1 including a tubular, longitudinally extending extension interposed between the end of said barrel remote from said inlet and adjacent or proximate said extrusion die.

6. Extrusion apparatus as set forth in claim 5 wherein said die includes structure defining a plurality of openings about the periphery thereof for longitudinal extrusion of said material, there being flow-directional means disposed within said extension for directing said material toward said openings.

7. Extrusion apparatus as set forth in claim 1 including means for altering the temperature of said material as the latter passes through said barrel.

8. Extrusion apparatus as set forth in claim 7 wherein said temperature-altering means comprises a series of jackets disposed about respective areas of said barrel and presenting corresponding zones for receiving temperature-altering media.

9. Extrusion apparatus as set forth in claim 1 wherein said screw includes a plurality of end-to-end interconnected screw elements, there being a steam lock interposed between at least one adjacent pair of said elements.

10. Extrusion apparatus as set forth in claim 1 wherein said adjacent surrounding portion of said barrel is imperforate for preventing escape of steam created within the region of said extruder proximal to said adjacent surrounding portion of said barrel.

11. Double extrusion apparatus for producing a dense, layered, substantially untwisted, meat analogue product, said apparatus comprising:

a first extruder for receiving a mixture comprising a vegetable protein and moisture and extruding the same to render the material hot, moist, and substantially denatured and unoriented;

a second extruder having an elongated, tubular barrel with a material inlet adjacent one end thereof and adjacent the outlet of said first extruder for receiving said extruded material from the first extruder, and an extrusion die adjacent the remaining end thereof; and an elongated, axially rotatable screw positioned within said barrel for moving a material to be extruded from said inlet towards and through said die, said screw including first, second and third longitudinally aligned sections, said first screw section having first flight means for moving said material from said inlet along the length of said barrel towards said second screw section, said second section having second flight means for compacting the material received from said first section, forming a first choke of the material within the barrel, said section having additional flight means thereon which is cooperable, with the adjacent surrounding portion of said barrel, for subdivision of said material during travel thereof towards said third section, wherein said second section includes means to cut into the material and increase the residence time of said material in the region thereof, said third section having third flight means for substantially recombining said subdivided material and forming a second choke of said material within the barrel.

12. Apparatus as set forth in claim 11 wherein said inlet of said second extruder is in spaced relationship to the outlet of said first extruder for allowing said extruded material to pass through the atmosphere prior to entrance thereof into said inlet, in order to volatilize undesirable favor precursors from the extruded material.

13. Extrusion apparatus as set forth in claim 11 wherein said second sections include a cut flight screw element which serves to increase the residence time of said material in the region thereof whereby to form said first choke.

14. Extrusion apparatus as set forth in claim 11 wherein said additional flight means, and said cooperable surrounding barrel portion, present a region of increased free volume within said barrel, as compared with the free volume within the barrel at the point where said first choke is formed, said last-mentioned free volume being defined by the material-compacting and choking portion of said second flight means and the adjacent surrounding length of said barrel.

15. Extrusion apparatus as set forth in claim 11 including a tubular, longitudinally extending extension interposed between the end of said barrel remote from said inlet and adjacent or proximate said extension die.

16. Extrusion apparatus for producing a meat analogue product from a mixture comprising a vegetable protein and moisture, said apparatus comprising:

an elongated, tubular barrel having a material inlet adjacent one end thereof and an extrusion die adjacent the remaining end thereof; and an elongated, axially rotatable screw positioned within said barrel for moving said material from said inlet towards and through said die, said screw including first, second and third longitudinally aligned sections, said first screw section having first flight means for moving said material from said inlet along the length of said barrel towards said second screw section, said second section having second flight means for compacting the material received from said first section and forming a first choke of the material within the barrel, said second section including a cut flight screw element which serves to increase the residence time of said material in the region thereof whereby to form said first choke, said section also having additional flight means thereon which is cooperable, with the adjacent surrounding portion of said barrel, for subdivision of said compacted material during travel thereof toward said third section, said third section having third flight means for substantially recombining said subdivided material and forming a second choke of said material within the barrel.

17. Extrusion apparatus for producing a meat analogue product from a mixture comprising a vegetable protein and moisture, said apparatus comprising:

an elongated, tubular barrel having a material inlet adjacent one end thereof and an extrusion die adjacent the remaining end thereof; and an elongated, axially rotatable screw positioned within said barrel for moving said material from said inlet towards and through said die, said screw including first, second and third longitudinally aligned sections, said first screw section having first flight means for moving said material from said inlet along the length of said barrel towards said second screw section, said second section having second flight means for compacting the material received from said first section and forming a first choke of the material within the barrel, said section also having additional flight means thereon which is cooperable, with the adjacent surrounding portion of said barrel, for subdivision of said compacted material during travel thereof toward said third section, said additional flight means, and said cooperable surrounding barrel portion, presenting a region of increased free volume within said barrel, as compared with the free volume within the barrel at the point where said first choke is formed, said last-mentioned free volume being defined by the material-compacting and choking portion of said second flight means and the adjacent surrounding length of said barrel.

* * * * *